United States Patent [19]
Reed

[11] Patent Number: 6,135,231
[45] Date of Patent: Oct. 24, 2000

[54] METHOD AND MEANS FOR PROVIDING A STEER-ASSIST AND ANTI-SPIN SYSTEM FOR HYDROSTATICALLY PROPELLED VEHICLES

[75] Inventor: James Richard Reed, Minneapolis, Minn.

[73] Assignee: Sauer Inc., Ames, Iowa

[21] Appl. No.: 09/288,469

[22] Filed: Apr. 8, 1999

Related U.S. Application Data

[60] Provisional application No. 60/083,267, Apr. 27, 1998.

[51] Int. Cl.$^7$ ................................................. B60K 7/00
[52] U.S. Cl. ........................... 180/308; 180/6.48; 180/307
[58] Field of Search ................................... 180/6.48, 308, 180/307, 305; 701/41, 42

[56] References Cited

U.S. PATENT DOCUMENTS

| | | | |
|---|---|---|---|
| 3,177,964 | 4/1965 | Anderson | 180/197 |
| 3,199,286 | 8/1965 | Anderson | 180/242 |
| 3,841,423 | 10/1974 | Holtkamp et al. | 180/6.3 |
| 3,901,339 | 8/1975 | Williamson | 180/6.48 |
| 4,103,489 | 8/1978 | Fletcher et al. | 60/395 |
| 4,399,886 | 8/1983 | Pollman | 180/197 |
| 4,402,377 | 9/1983 | Brooks et al. | 180/197 |
| 4,549,610 | 10/1985 | Van der Lely | 172/3 |
| 4,715,466 | 12/1987 | Ishii et al. | 180/233 |
| 4,914,592 | 4/1990 | Callahan et al. | 364/424.05 |
| 4,972,916 | 11/1990 | Miller | 180/140 |
| 4,995,470 | 2/1991 | Yamaguchi et al. | 180/197 |
| 5,147,010 | 9/1992 | Olson et al. | 180/197 |
| 5,152,191 | 10/1992 | Sato et al. | 74/844 |
| 5,201,570 | 4/1993 | Heren et al. | 303/10 |
| 5,427,195 | 6/1995 | Paul et al. | 180/308 |
| 5,775,453 | 7/1998 | Williams et al. | 180/197 |

*Primary Examiner*—Brian L. Johnson
*Assistant Examiner*—Daniel Yeagley
*Attorney, Agent, or Firm*—Zarley, McKee, Thomte, Voorhees & Sease

[57] ABSTRACT

A hydraulically propelled vehicle has a vehicle body with a pair of forward wheels and a pair of rearward wheels. A single fluid displacement pump is operatively connected to each wheel. A fluid displacement motor is connected to each wheel. The pump is fluidly connected to each motor. A steering angle sensor is located adjacent each wheel to sense the angular position of each wheel. The speed sensor is on each motor to measure its rotational speed output. A fluid displacement actuator is on each motor to set the fluid displacement thereof. A fluid displacement computer controller is operatively connected by electronic impulse to the speed sensors. The fluid displacement actuators and the steering angle sensors are operatively connected to the controller so that the controller can obtain information therefrom to calculate the expected speeds for the motors. A circuit on the controller compares the actual speed of the motors with the calculated speed thereof so the controller can cause the fluid displacement to be reduced on any motor that exceeds the calculated speed.

3 Claims, 2 Drawing Sheets

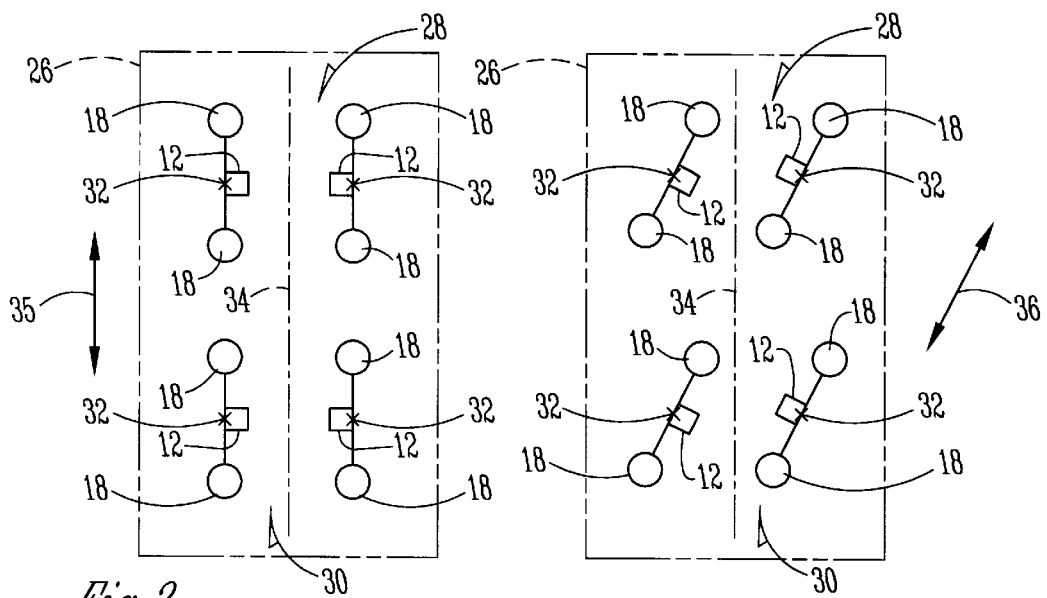
Fig.2　　　　　　　　　　　　Fig.3
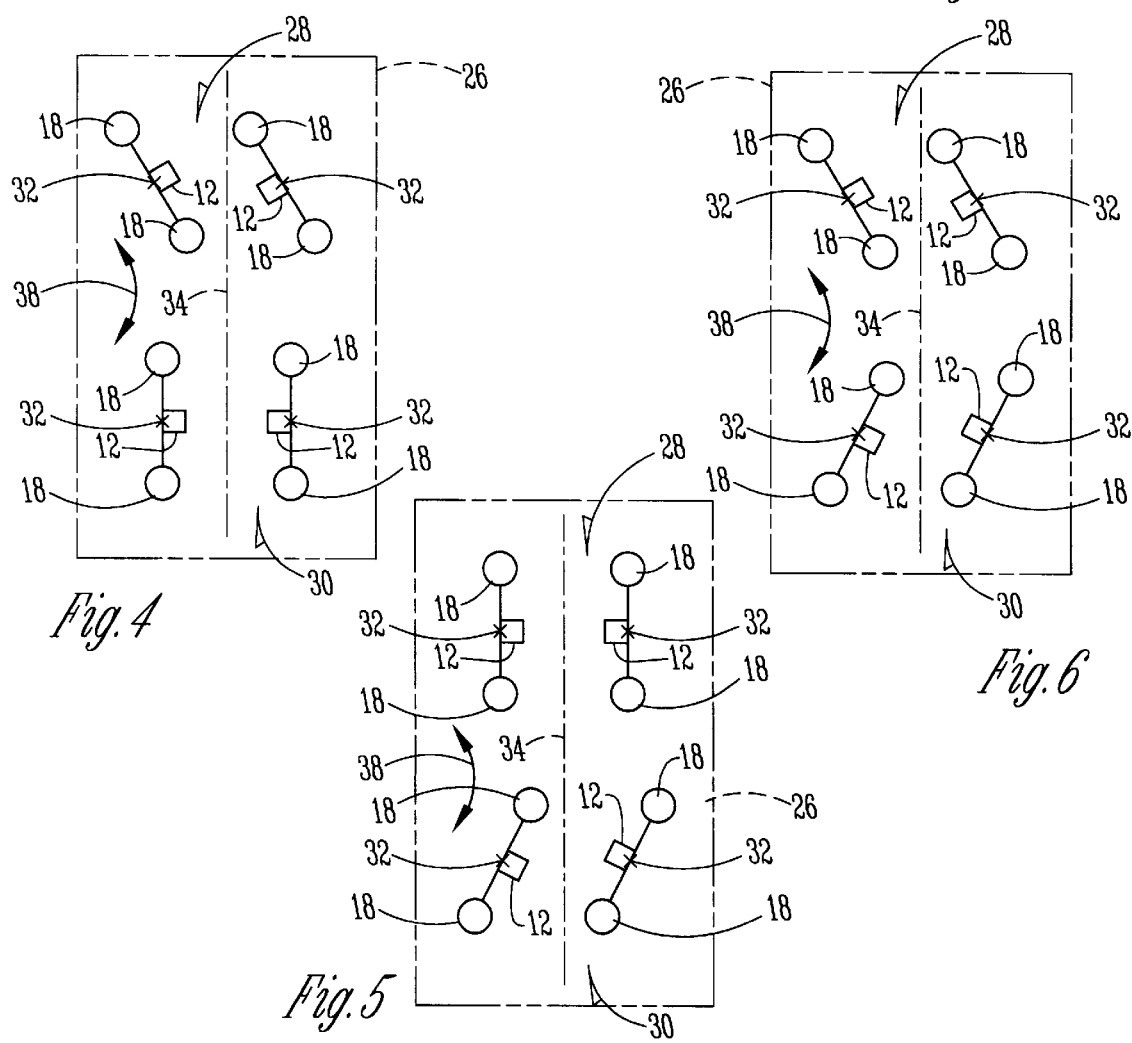
Fig.4　　　　　　　　　　　　Fig.6
Fig.5

METHOD AND MEANS FOR PROVIDING A STEER-ASSIST AND ANTI-SPIN SYSTEM FOR HYDROSTATICALLY PROPELLED VEHICLES

This Application is Based Upon the Applicant's Provisional Application Ser. No. 60/083,267 Filed Apr. 27, 1998.

BACKGROUND OF THE INVENTION

The present invention relates to the field of vehicle propulsion systems. More particularly, the invention relates to a hydrostatic vehicle propulsion system consisting of a single, variable fluid displacement pump in conjunction with multiple variable fluid displacement motors, and a motor displacement controller to provide steer-assist and anti-spin functions.

Hydrostatic vehicle propulsion systems frequently are configured utilizing a single variable fluid displacement pump in conjunction with multiple variable fluid displacement motors. Such propel system designs have proven to be quite useful for vehicles that are not adapted particularly well for mechanical transmission and axle configurations. Harvesting machines, for example, often require remote engine location, or unique structural configuration to accommodate processing mechanisms for gathering, feeding and separating crop materials. In such instances, the use of multiple hydrostatic drives that can be located independently at drive wheel locations is quite advantageous.

The use of multiple variable fluid displacement motors connected in a parallel circuit with a single variable fluid displacement pump creates several problems. One problem is maintaining the proper balance of motor torque when the vehicle is being steered through a turning maneuver. Another problem is control of motor torque in a manner that will prevent wheel slip or spin in the event that one or more wheels may lose traction.

It is a primary objective of this invention to provide a vehicle propulsion system comprised of a single variable fluid displacement pump connected in a parallel hydrostatic circuit with multiple variable fluid displacement motors.

Further, it is an objective of this invention to provide a control system that will adjust the fluid displacement of the motors commensurate with the associated relationship of the vehicle steering geometry.

Additionally, it is an objective of this invention to determine the steering geometry of the vehicle by measuring the steering angle of each wheel.

Yet another objective of this invention is to control the fluid displacement of the motors in a manner to prevent wheel spin.

It is also an objective of this invention to measure the rotational speed of each wheel in combination with the steering angle of each wheel to determine and subsequently control the appropriate fluid displacement of each motor to assist steering and prevent wheel spin.

SUMMARY OF THE INVENTION

The present invention relates to a vehicle propulsion system consisting of a single variable fluid displacement pump connected in a parallel fluid circuit to multiple variable fluid displacement motors. The motors power the drive wheels of the vehicle and the fluid displacement of the motors is managed by a motor displacement control mechanism. The control makes motor fluid displacement decisions based on the inputs of motor speed and steering angle, and programmed knowledge of the vehicle geometry.

The propulsion system includes a variable fluid displacement pump that is usually driven by an internal combustion engine. The pump is connected in a closed parallel hydraulic circuit with a plurality of variable fluid displacement motors. The motors are typically arranged on the vehicle in a manner to position a single motor to power each drive wheel. The most common configuration is that of a four-wheeled vehicle, thereby incorporating four motors in the hydrostatic propulsion system.

The propulsion system supplies motive force to the vehicle when the pump is activated to supply fluid flow to the wheel drive motors. The pump is normally capable of providing a bi-directional flow of fluid so that the vehicle can be driven in either forward or reverse directions. The fluid displacement of the motors is initially set to their maximum value. At the maximum fluid displacement setting, the motors generate maximum torque output, but are limited to relatively slow speed. In order to attain higher speed, the fluid displacement of the motors is decreased, thus causing them to consume a lower volume of fluid per output revolution, or to generate increased output revolutions per unit of fluid flow. As fluid flow is pumped to the motors, thereby generating torque at the wheels, the wheels turn and the vehicle moves. Vehicle movement is dependent on the traction interface between the wheels and the ground. If this interface is insufficient to effectively resist the torque output of the wheel, the wheel may spin, a condition also referred to as "loss of traction". In order to eliminate or minimize wheel spin, a motor displacement controller is incorporated.

Another vehicle propulsion characteristic which must be accommodated in the motor fluid displacement control mechanism is steering. Steering can be accomplished by various combinations of angular displacement of the wheels ("steering wheels") relative to the longitudinal axis of the vehicle. The front wheels of the vehicle may be steered while the rear wheels are maintained in a "straight ahead" alignment or vice-versa. All four wheels may be steered simultaneously in a "coordinated" mode to generate a very small turning radius. Additionally, all four wheels may be steered in a "unidirectional" mode to generate a condition known as "crab" steering. In "crab" steer mode, the vehicle travels in a straight line that is at an angular displacement to the longitudinal axis of the vehicle. As the vehicle is engaged in a steering operation, the fluid displacement of the motors must be changed, often with respect to one another. This function is also accomplished by the aforementioned motor displacement controller.

The motor displacement controller functions to continuously maintain the appropriate fluid displacement of each of the motors in the propulsion system. The controller receives speed signals from the motors and receives angularity position signals from the steering mechanism. These input signals are processed through pre-programmed algorithms that determine if the fluid displacement of each individual motor is correct for the instant vehicle speed and steering geometry. Subsequently, if the controller concludes that any motor is operating in a manner inconsistent with the defined condition set, a signal is sent to the fluid displacement actuator of the offending motor for correction.

Two specific operating conditions that the motor displacement controller is programmed to identify and manage are wheel spin and steering assist. Wheel spin is a condition that is detrimental to optimum vehicle performance. Wheel spin occurs when the traction interface between the wheel and the ground is insufficient to resist the torque output of the wheel. Loss of traction may result from weight transfer on the vehicle, causing insufficient down force on the wheel, or ground surface conditions may present a relatively low coefficient of friction. Regardless of the cause, the effect is wheel spin, the condition where the circumfrential linear speed of the wheel becomes greater than the ground speed of the vehicle. The controller is programmed to recognize this condition by combining wheel speed, steering angle, and vehicle geometry data, subsequently identifying the lowest wheel speed value, and comparing the speeds of the other driven wheels. If any wheel speed is determined to be inconsistent with these conditions, the offending motor(s) is signaled to reduce its fluid displacement. Reduction of fluid displacement lowers the output torque of the motor, until the motor torque is insufficient to spin the overspeeding wheel.

Steering assist is the condition whereby the fluid displacement of the motors is adjusted to provide differential torque between the inside and outside wheels of the vehicle while negotiating a turn. During straight-line vehicle propulsion, the motors are set to equal displacements to produce equalized driving torque on both sides of the vehicle. This torque equalization contributes to maintaining the straight ahead trajectory of the vehicle. When the vehicle operator wishes to turn the vehicle, the pair of steerable wheels are directionally rotated together about a vertical axis, causing them to be angularly displaced in relation to the longitudinal axis of the vehicle. The resulting angular position of the wheels causes the vehicle to turn, following the direction of the wheels. It has been determined that further enhancement of turning effort is achievable by also generating a differential in the torque of the driving wheels between the inside and outside of the vehicle relative to the turning axis. Torque-differential steering is a principle commonly incorporated in skid-steer vehicles such as track driven crawlers. In the case of wheeled vehicles, torque-differential steering can be used to turn vehicles that have their wheels fixedly mounted in the straight-ahead orientation parallel to the longitudinal axis of the vehicle. This is the configuration typically incorporated in skid-steer loaders.

Torque-differential steering becomes an assist mechanism on a wheel-steered vehicle. In the case of the instant invention, torque-differential assisted steering is accomplished by changing the fluid displacement of the motors. As the wheels are being steered, the motors of the drive wheels located toward the inside turning radius of the vehicle have their fluid displacement reduced in relation to the motors located toward the outside turning radius of the vehicle. The motor displacement controller accomplishes this function by evaluating steering angle and vehicle geometry data. Subsequently, the controller determines and delivers the appropriate fluid displacement control command to the displacement actuator of the motors.

Continuous processing of motor speed, steering angle, and vehicle geometry data allows the motor displacement controller to provide steer-assist and anti-spin function within the vehicle propulsion system.

BRIEF DESCRIPTION OF THE DRAWINGS

FIGS. 2–6 are a sequence of vehicle diagrams depicting the various steering configurations controllable by the present invention.

DESCRIPTION OF THE PREFERRED EMBODIMENT

Figure 1:
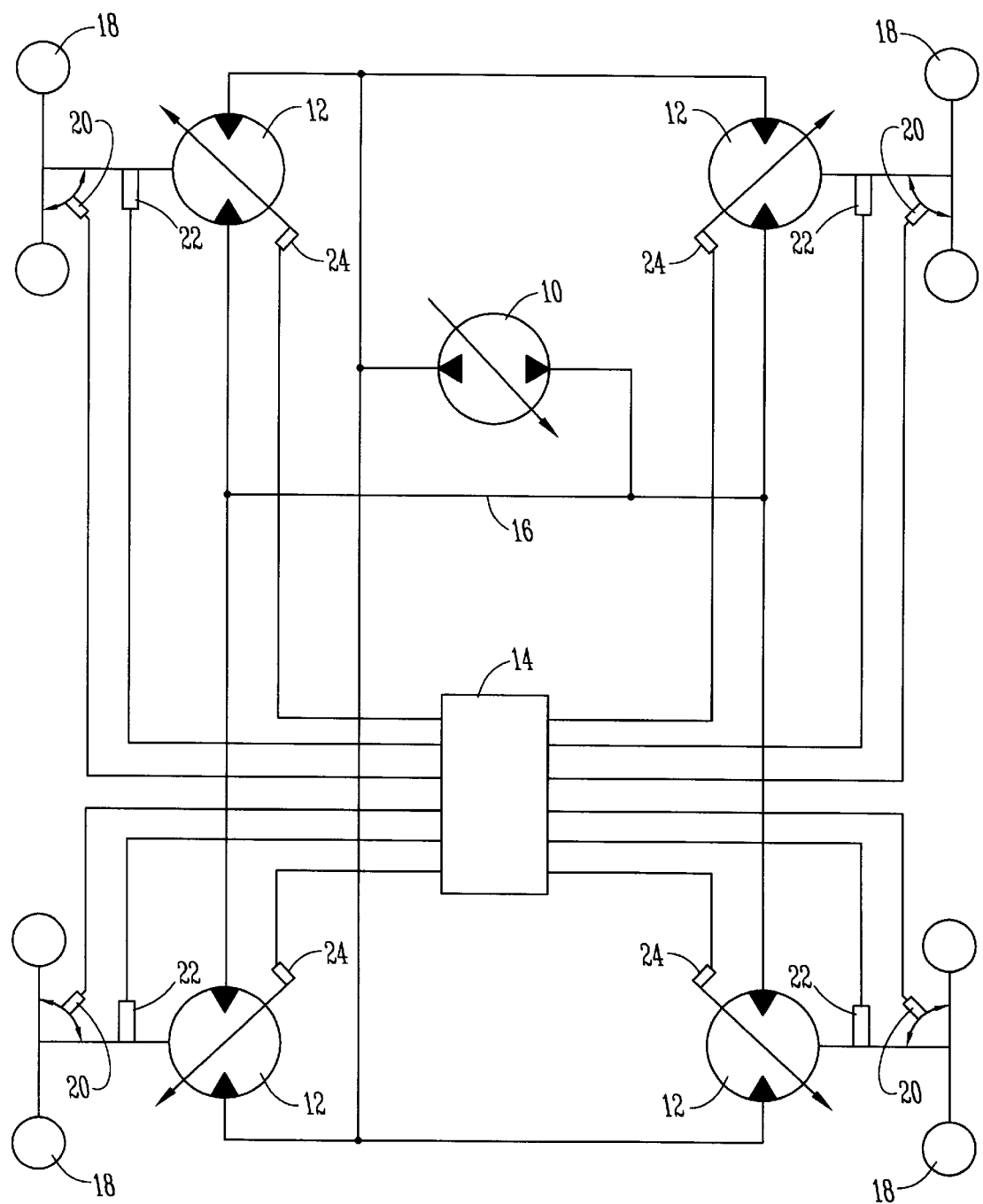
FIG. 1 is a schematic diagram depicting the single pump, multiple motor and displacement control system of the present invention.

The schematic of the present invention is shown in FIG. 1. The hydrostatic propulsion system consisted primarily of a single variable fluid displacement pump (10), multiple (in this case four) variable fluid displacement motors (12), and a motor displacement controller (14). The pump (10) and motors (12) are fluidly connected in a closed loop hydrostatic circuit (16). Each motor (12) drives a wheel (18). Each motor is equipped with a speed sensor (22) and a fluid displacement actuator (24). Additionally, a steering angle sensor (20) is positioned at each steerable wheel location.

In operation, the pump (10), which is typically driven by an internal combustion engine on the vehicle, supplies pressurized fluid to drive motors (12). The vehicle operator controls the fluid displacement of the pump (10) to determine the forward or reverse travel direction of the vehicle and the ground travel speed of the vehicle. The vehicle operator also determines the course of travel that the vehicle follows by controlling the steering angle of the wheels (18). During vehicle operation, the speed of the motors (12) is detected by motor speed sensors (22). The steering angle of the wheels is ascertained by steering angle sensors (20). The signals from these sensors (20) and (22) are continuously supplied to the motor displacement controller (14).

With reference to FIGS. 2–6, a vehicle (26) has a pair of front wheels (28) and a pair of rear wheels (30). Each wheel (18) of each pair of wheels is powered by one of the motors (12). The wheels (18) in each pair move in unison with each other about vertical axes (32). The numeral (34) designates the longitudinal centerline or longitudinal axis of the vehicle (26).

FIG. 2 shows the vehicle (26) in a straight ahead travel mode (arrow 35); FIG. 3 shows the vehicle in a crab steer mode in the direction of arrow (36); and FIGS. 4–6 show the vehicle in various turning modes shown by arrows (38).

While the vehicle is in the travel mode, the controller (14) evaluates the speed signals that are received from sensors (22). The signals are compared to determine the motor (12) with the lowest speed. the slowest motor (12) is established as the reference to ground travel speed. The controller (14) utilizes the steering angles and vehicle geometry to calculate the expected speed for the remaining motors (12). The calculated speeds are then compared to the actual speeds as reported by sensors (22). Any speed signal that exceeds the calculated value is indicative of a slipping or spinning wheel. The controller (14) subsequently sends a signal to the displacement actuator (24) of the offending motor (12) to cause its fluid displacement to be reduced. Reducing the fluid displacement of a motor (12) results in a reduction of the output torque such that the motor cannot sustain the slipping or spinning condition. When the motor (12) achieves a satisfactory rate of speed, the controller (14) dispatches a signal to displacement actuator (24) to cause the motor (12) to resume operation at its normally functional fluid displacement. Controller (14) continuously carries out this speed analysis and adjustment to provide anti-spin control for the vehicle propulsion system.

While the vehicle is traveling in a straight line (FIG. 2), the fluid displacement of motors (12) are all equal whereby providing equal output torque to the wheels (18). The resulting torque equalization contributes to the vehicle ability to continue traveling in a straight line. If the vehicle operator wishes to cause the vehicle to turn, (FIGS. 4–6), the angular steering wheels (12) are turned in the desired direction. As shown in FIGS. 2–6, the vehicle (26) will tend to follow the direction of travel that the wheels (18) are directed. As a means of further assisting the vehicle tendency to turn, the fluid displacement of motors is changed. When wheels (18) are positioned to steer, steering angle sensors (20) send the associated signals to controller (14). Controller (14) evaluates these signals to determine the direction of steer, and consequently identify the wheels (18) that are located toward the inside turn radius of the vehicle. Subsequently, the controller signals the displacement actuators (24) of the inside wheel motors (12) to reduce their fluid displacement. The resulting reduction in fluid displacement reduces the torque output of the inside wheels (18). The torque differential that is generated between the inside and outside wheels (18) produces additional steering tendency in the vehicle to follow in the steered direction. When the wheels (18) are steered to the straight line orientation (FIG. 2) the controller (14) will recognize this from the signals being processed from the steering angle sensors (20) and will instruct the displacement actuators (24) to return the fluid displacement of motors (12) to equal values. Controller (14) continuously carries out this steering analysis and adjustment to provide steer-assist for the vehicle propulsion system.

Therefore, it can be seen that the invention at least accomplishes all of its stated objectives.

What is claimed is:

1. A hydrostatically propelled vehicle, comprising, a vehicle body having a pair of forward wheels and a pair of rearward wheels, each of the wheels having a respective axis of rotation, at least one of the pairs of wheels being steerable wheels, each of the steerable wheels being mounted on the vehicle body so as to directionally pivot about a vertical axis extending through the axis of rotation, the pair of steerable wheels being adapted to pivot in unison and in substantial parallel relation with each other, a variable fluid displacement motor connected to each wheel to drive each wheel about the axis of rotation, a hydraulic pump on the vehicle body and fluidly connected to each motor to form a closed loop hydrostatic circuit, a variable fluid displacement actuator operatively connected to each motor to set the fluid displacement thereof, a steering angle sensor on the vehicle body adjacent each steerable wheel to sense the angular position of the steerable wheel with respect to a longitudinal axis of the vehicle, a speed sensor on each motor to measure its rotational speed output, a plurality of fluid displacement actuators connected respectively to each motor for varying the displacement of each motor independently, steering means on the vehicle for pivoting the steerable wheels about the vertical axes, causing said steerable wheels to be angularly displaced in relation to the longitudinal axis of the vehicle, power means on the vehicle for driving the pump to energize the hydrostatic circuit, a fluid displacement computer controller on the vehicle for controlling the fluid displacement of the motors, the controller being operationally connected by electronic impulse to the speed sensors, and the steering angle sensors, so that the controller can utilize the actual steerable wheel angles and the motor speeds to calculate the expected speed for the motors, an evaluating means on the controller for comparing the actual speeds of the motors with the calculated speeds thereof whereupon the controller can send a signal to the displacement actuator of a motor that is exceeding the calculated speed to cause its fluid displacement to be reduced.

2. A method for providing a steer-assist and anti-spin system for hydrostatically propelled vehicles which have a vehicle body having a pair of forward wheels and a pair of rearward wheels with at least one of the pairs of the wheels being steerable wheels and are mounted on the vehicle body to directionally pivot about a vertical axis, with the steerable wheels adapted to move in unison and in substantial parallel relation, comprising, providing a variable fluid displacement motor for each wheel to drive each wheel about a rotational axis, fluidly connecting a hydraulic pump on the vehicle to each motor to form a closed loop hydrostatic circuit, providing a steering angle sensor on the vehicle adjacent each steerable wheel to sense the angular position thereof, providing a speed sensor on each motor to measure its rotational speed output, providing a fluid displacement actuator on each motor to set the fluid displacement thereof, providing a fluid displacement computer control for controlling the fluid displacement of the motors, operationally connecting the controller by electrical impulses to the speed sensors, the fluid displacement actuators, and the steering angle sensors, causing the controller to receive data pertaining to the actual steering angles and the motor speeds to calculate the expected speed for the motors based upon such data, comparing the actual speeds of the motors with the calculated speeds thereof and thereupon causing the displacement actuator on a motor that is exceeding the calculated speed to cause its fluid displacement to be reduced.

3. A method for providing a steer-assist and anti-spin system for hydrostatically propelled vehicles which have a vehicle body having a pair of forward wheels and a pair of rearward wheels with at least one of the pairs of the wheels being steerable wheels and are mounted on the vehicle body to directionally pivot about a vertical axis, with the steerable wheels adapted to move in unison and in substantial parallel relation, comprising, hydraulically driving the wheels with variable fluid displacement hydraulic motors having a rotational power output, collecting data by sensing the speed of rotational power output of the motor and sensing the directional configuration of the steerable wheels, calculating the expected speed of rotational power output of the motors from the collected data, comparing the actual speed of rotational power output of the motors with the calculated expected speed of rotation thereof, and reducing the fluid displacement in the hydraulic motors that are exceeding the calculated expected speed of rotational power output.

* * * * *